United States Patent
Izquierdo et al.

(10) Patent No.: US 9,506,423 B2
(45) Date of Patent: Nov. 29, 2016

(54) FLOW CONTROL DEVICE FOR A THREE STREAM TURBOFAN ENGINE

(71) Applicant: United Technologies Corporation, Hartford, CT (US)

(72) Inventors: Felix Izquierdo, Boynton Beach, FL (US); Robert H. Bush, Glastonbury, CT (US); Timothy J. McAlice, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 192 days.

(21) Appl. No.: 14/206,232

(22) Filed: Mar. 12, 2014

(65) Prior Publication Data
US 2015/0121841 A1    May 7, 2015

Related U.S. Application Data

(60) Provisional application No. 61/781,791, filed on Mar. 14, 2013.

(51) Int. Cl.
| | |
|---|---|
| *F02K 3/075* | (2006.01) |
| *F02K 3/077* | (2006.01) |
| *F02K 1/08* | (2006.01) |
| *F02K 1/38* | (2006.01) |
| *F02K 1/46* | (2006.01) |
| *F02K 1/28* | (2006.01) |

(52) U.S. Cl.
CPC ............. *F02K 3/075* (2013.01); *F02K 1/08* (2013.01); *F02K 3/077* (2013.01); *F02K 1/28* (2013.01); *F02K 1/383* (2013.01); *F02K 1/46* (2013.01); *F05D 2270/051* (2013.01)

(58) Field of Classification Search
CPC .......... F02K 3/075; F02K 3/077; F02K 1/08; F02K 1/383; F02K 1/28; F02K 1/46
See application file for complete search history.

(56) References Cited

U.S. PATENT DOCUMENTS

| | | | | |
|---|---|---|---|---|
| 2,408,099 A | * | 9/1946 | Sherman | ................ F02K 1/08 239/265.19 |
| 4,043,508 A | * | 8/1977 | Speir | .................... F02K 1/08 239/265.19 |
| 4,064,692 A | | 12/1977 | Johnson et al. | |
| 4,072,008 A | * | 2/1978 | Kenworth | ............ F02K 3/075 60/262 |
| 4,285,194 A | * | 8/1981 | Nash | ................... F02K 1/822 60/262 |
| 4,409,788 A | * | 10/1983 | Nash | ................... F02K 1/822 415/157 |
| 5,778,659 A | * | 7/1998 | Duesler | ................ F02K 1/09 239/265.27 |
| 6,901,739 B2 | | 6/2005 | Christopherson | |
| 7,614,210 B2 | | 11/2009 | Powell et al. | |
| 8,104,265 B2 | | 1/2012 | Kupratis | |
| 8,161,728 B2 | | 4/2012 | Kupratis | |
| 2009/0016874 A1 | * | 1/2009 | Corsmeier | ........... F02K 3/077 415/145 |
| 2010/0043394 A1 | * | 2/2010 | Pero | .................... F01D 17/14 60/226.3 |
| 2012/0321448 A1 | | 12/2012 | Pesyna et al. | |

* cited by examiner

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A gas turbine engine includes a core engine, a first bypass passage disposed about the core engine and a second bypass passage disposed about the first bypass passage. A flow control is disposed within the second bypass for controlling bypass airflow through the second bypass. The flow control translates axially between an open position and a closed position to vary and control airflow through the second bypass passage.

5 Claims, 4 Drawing Sheets

FLOW CONTROL DEVICE FOR A THREE STREAM TURBOFAN ENGINE

CROSS REFERENCE TO RELATED APPLICATION

This application claims priority to U.S. Provisional Application No. 61/781,791 filed on Mar. 14, 2013.

STATEMENT REGARDING FEDERALLY SPONSORED RESEARCH OR DEVELOPMENT

This invention was made with government support under contract number FA8650-09-D-2923 awarded by the United States Air Force. The government has certain rights in the invention.

BACKGROUND

A gas turbine engine typically includes a fan section and a core engine section including a compressor section, a combustor section and a turbine section. Air entering the compressor section is compressed and delivered into the combustion section where it is mixed with fuel and ignited to generate an exhaust gas flow. The exhaust gas flow expands through the turbine section to drive the compressor and the fan section, and is also accelerated through an exhaust nozzle to generate thrust.

The fan section drives air through a first bypass passage defined about the core engine. High bypass turbine engines include large bypass passages as compared to airflow through the core engine section and are suited for fuel efficient operation. Engines for applications in high speed aircraft include smaller bypass passages and generate more thrust from the core engine section. Fuel efficiency is increased by utilizing the bypass passage to generate thrust. Greater thrust is generated with more flow through the core engine section as relative to the bypass passage. Fuel efficiency is therefore balanced against aircraft thrust requirements and therefore, smaller bypass passages are utilized to provide higher thrust requirements that sacrifice some fuel efficiency.

A variable cycle gas turbine engine can switch between highly fuel efficient operation with an increased amount of bypass airflow and high speed operation with less bypass airflow and more thrust produced from the core engine section through the exhaust nozzle.

Although variable cycle gas turbine engines have improved operational efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a core engine, a first bypass passage disposed about the core engine, a second bypass passage disposed about the first bypass passage, and a flow control disposed within the second bypass for controlling bypass airflow through the second bypass. The flow control translates axially between an open position and a closed position.

In a further embodiment of the foregoing gas turbine engine, includes an exhaust nozzle defining an exhaust passage for a core gas flow from the core engine and the first bypass flow from the first bypass passage. The second bypass passage includes an outlet opening disposed radially outward of the exhaust passage.

In a further embodiment of any of the foregoing gas turbine engines, the outlet includes an open portion and a converging portion.

In a further embodiment of any of the foregoing gas turbine engines, the flow control includes a tear-drop shape in cross-section that imparts substantially no radial component to airflow exiting the outlet of the second bypass passage.

In a further embodiment of any of the foregoing gas turbine engines, the flow control is annular about an engine axis.

In a further embodiment of any of the foregoing gas turbine engines, the flow control translates axially forward to the open position and axially aft to the closed position.

In a further embodiment of any of the foregoing gas turbine engines, the flow control seats against walls of the second bypass passage in the closed position.

In a further embodiment of any of the foregoing gas turbine engines, includes an actuator for translating the flow control between the open and closed positions.

A bypass flow control assembly for turbine engine according to an exemplary embodiment of this disclosure, among other possible things includes an outlet for a bypass passage including an open portion axially forward of a converging portion and a flow control disposed within the outlet and movable axially from an open position in the open portion and a closed position within the converging portion.

In a further embodiment of the foregoing bypass flow control assembly, the flow control includes a tear-drop cross-section.

In a further embodiment of any of the foregoing bypass flow control assemblies, the flow control is annular.

In a further embodiment of any of the foregoing bypass flow control assemblies, includes an actuator for moving the flow control axially within the outlet.

In a further embodiment of any of the foregoing bypass flow control assemblies, the outlet is disposed radially outward of an inner bypass passage and exhaust nozzle of the turbine engine.

A method of controlling bypass flow through a bypass passage according to an exemplary embodiment of this disclosure, among other possible things includes supporting a flow control within an outlet of a bypass passage, and translating the flow control axially within the bypass passage to vary an area of the outlet without imparting a radial component on the bypass flow.

In a further embodiment of the foregoing method, the outlet includes an open portion axially forward of a converging portion and moving the flow control between the open portion and the converging portion to vary the bypass flow.

In a further embodiment of any of the foregoing methods, the flow control includes a substantially tear-drop shape in cross section and defines inner and outer flow paths of equal area through the outlet.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
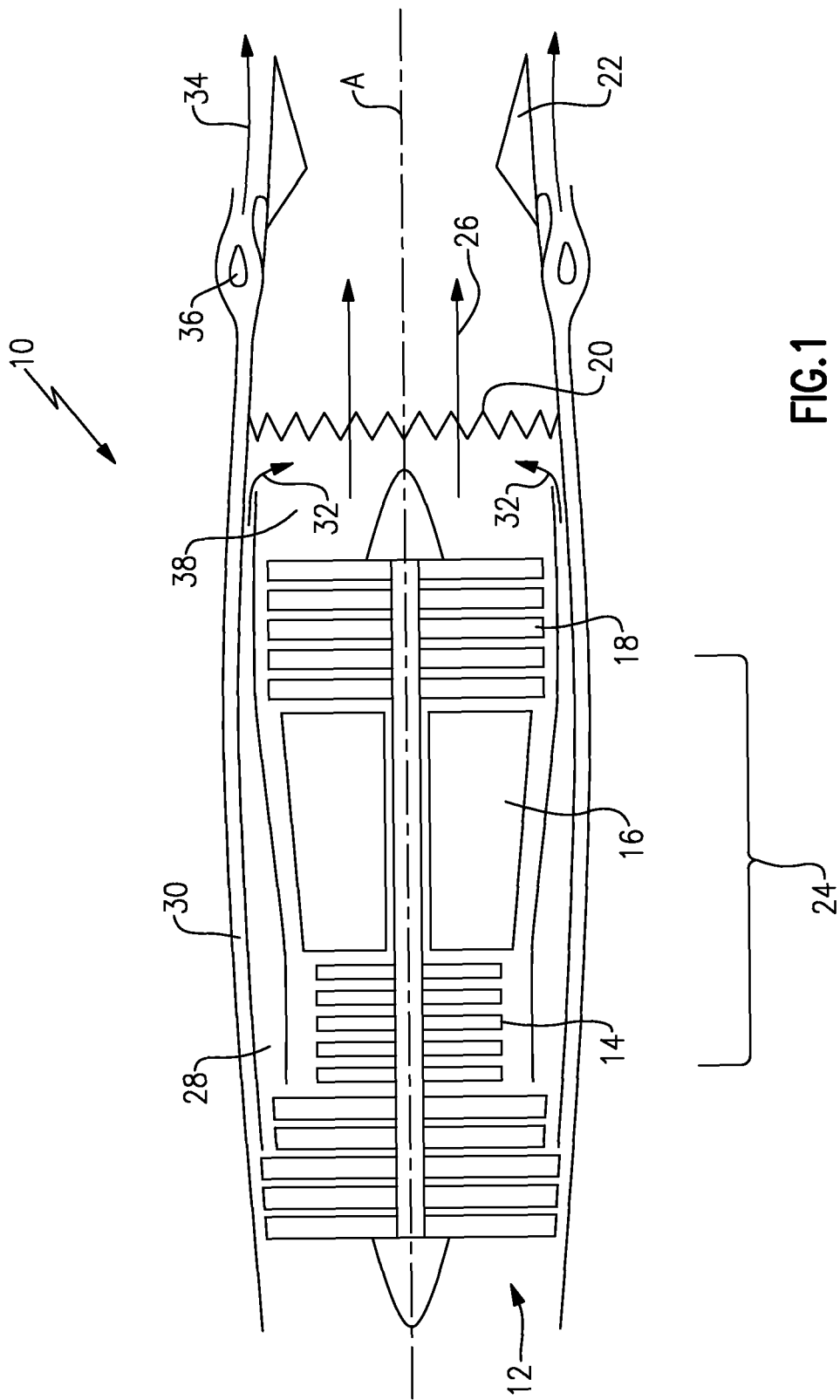
FIG. 1 is a schematic view of an example gas turbine engine.

FIG. 1 schematically illustrates a variable cycle gas turbine engine 10 that includes a fan 12 and a core engine 24 disposed about an axis A. The core engine 24 includes a compressor 14 that compresses air and supplies that air to a combustor 16 where the compressed air is mixed with fuel and ignited to generate an exhaust gas flow that expands through a turbine section 18. The turbine section 18 in turn drives the compressor section 14 and the fan 12.

The example gas turbine engine 10 also includes an augmenter section 20 where additional fuel from a core flow path 38 can be mixed with exhaust gasses and ignited to generate additional thrust. The exhaust gas or core flow 26 flows through a nozzle 22 that includes a convergent/divergent portion to produce thrust.

The example engine 10 includes a first bypass passage 28 that is disposed annularly around the core engine 24 and a second bypass 30 that is disposed radially outward of the first bypass 28. Bypass airflow 32 through the first bypass passage 28 and second bypass flow 34 through the second bypass passage 30 provides for an increased efficiency of thrust production by the engine 10. Bypass airflow through the bypass passages 28 and 30 improves fuel efficiency and is utilized in a fuel efficient or cruise mode of the gas turbine engine 10. Accordingly, airflow through the first and second bypass passages 28 and 30 can be utilized to increase overall engine efficiency and reduce fuel consumption at cruising speeds.

In some engine applications, it is desired to provide increased thrust production by closing off at least one of the bypass passages 28, 30 and increasing airflow through the core engine 24. In the example engine 10, a flow control 36 is provided in the second bypass passage 30 to control bypass airflow 34.

Figure 2:
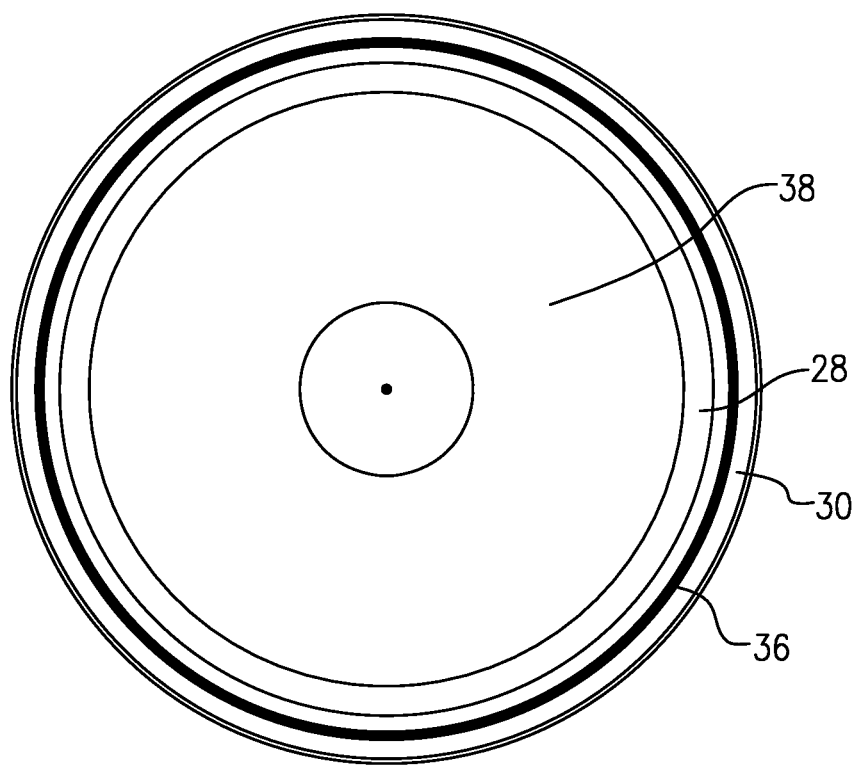
FIG. 2 is a schematic view of an exhaust nozzle for the example gas turbine engine.
Figure 3:
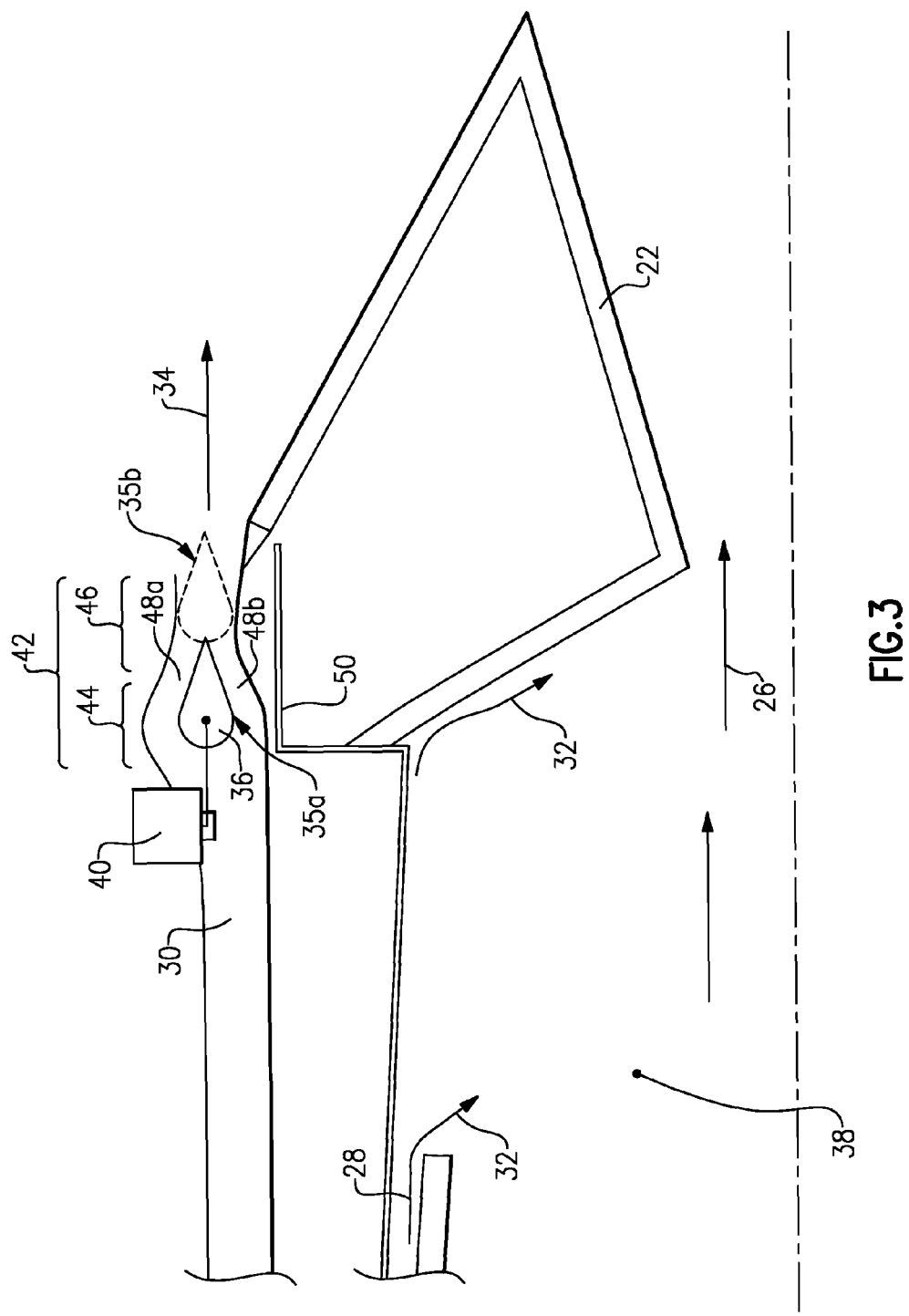
FIG. 3 is an enlarged sectional view of an example flow control for a second bypass passage.
Figure 4:
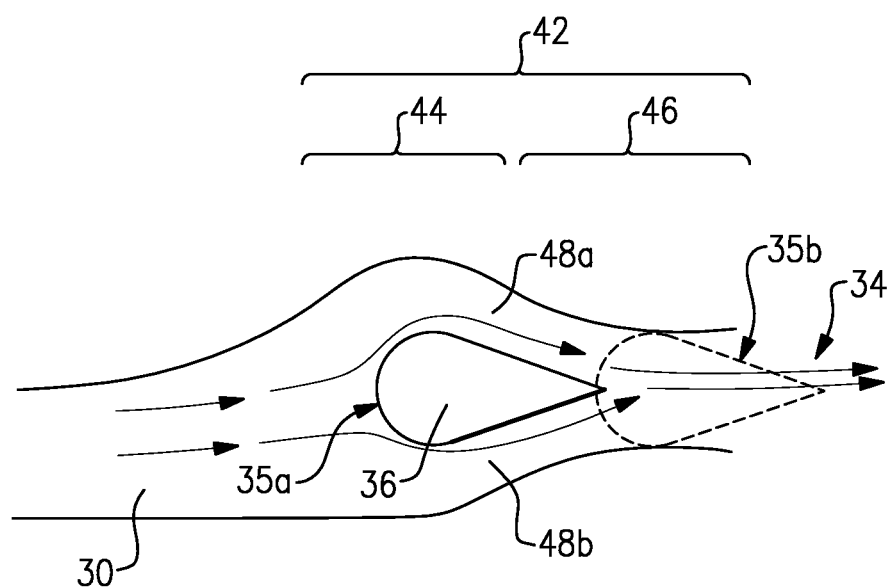
FIG. 4 is another enlarged sectional view of the example flow control.

Referring to FIGS. 2 and 3, the example flow control 36 is an annular structure disposed at an outlet 42 of the second bypass passage 30. A static structure 50 supports a portion of the exhaust nozzle 22 between the first bypass passage 28 and the second bypass passage 30. Where the first bypass passage 28 exhausts into the nozzle 22, the second bypass airflow 34 passes through the second bypass passage 30 and exhausts radially outward of the nozzle 22 through the outlet 42.

Flow control 36 comprises a teardrop shape in cross section as is shown in FIG. 3 and moves axially between an open position 35a illustrated in FIG. 3 and a closed position 35b indicated by dotted lines. In the closed position 35b, the flow control 36 is in contact with walls of the bypass passage 30 to prevent airflow 34 from exiting through the outlet 42. Air is then forced to flow through the core engine 24 or the first bypass passage 28 to enable increased thrust at the cost of reduced fuel efficiency.

The example flow control 36 translates axially within the outlet 42 to move between the open and closed positions. The teardrop shape of the flow control 36 provides for the substantial elimination of any radial component generated in the flow 34 exiting through the outlet 42. Moreover, although the example flow control 36 is illustrated as at teardrop shape, other shapes could be utilized and are within the contemplation of this disclosure.

The flow control 36 is driven axially by an actuator or actuators 40 that moves it between an open portion 44 and a convergent portion 46 of the outlet 42. The combination of the flow control 36 moving between the open portion 44 and the converging portion 46 defines upper and lower passages 48a, 48b around the flow control 36.

The example upper and lower passages 48a, 48b are substantially of an equal area to provide an equal airflow around the flow control 36. The teardrop shape, including a rounded surface that is upstream and a pointed surface downstream directs airflow in a manner that substantially reduces radial components in the exiting airflow 34. Moreover, the passages 48a and 48b around the flow control 36 may be of different sizes and still be within the contemplation of this disclosure.

In operation, when it is desired to increase thrust or otherwise modify the amount of bypass airflow, the second bypass passage 30 is closed by controlling the actuator 40 to drive the flow control 36 from the open portion 44 into the convergent portion 46 of the outlet 42. The second bypass airflow 34 is thereby restricted until such time it is completely stopped when the flow control 36 contacts walls of the second bypass passage 30.

Accordingly, the example flow control 36 provides a control device that limits the radial component of bypass flow 34 through the second bypass 30 to improve thrust production and fuel efficiency when in an open position. Moreover, the flow control 36 improves airflow when in an open position.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a core engine;
   a first bypass passage disposed about the core engine;
   a second bypass passage disposed about the first bypass passage, wherein the second bypass passage includes an outlet opening;
   an exhaust nozzle defining an exhaust passage for a core gas flow from the core engine and a first bypass flow from the first bypass passage, wherein the outlet opening is disposed radially outward of the exhaust passage, the outlet opening including an open portion and a converging portion; and
   a flow control disposed within the second bypass passage for controlling bypass airflow through the second bypass passage, the flow control movable axially between an open position and a closed position, the flow control comprising a tear-drop shape in cross-section, wherein the flow control translates axially aft to the closed position and axially forward to the open position, wherein the flow control seats against walls in the outlet opening of the second bypass passage in the closed position.

2. A gas turbine engine comprising:
   a core engine;
   a first bypass passage disposed about the core engine;
   a second bypass passage disposed about the first bypass passage;

an exhaust nozzle defining an exhaust passage for a core gas flow from the core engine and a first bypass flow from the first bypass passage, wherein the second bypass passage includes an outlet opening disposed radially outward of the exhaust passage, the outlet opening including an open portion and a converging portion; and a flow control disposed within the second bypass passage for controlling bypass airflow through the second bypass passage and the outlet opening, the flow control movable axially between an open position and a closed position, the open position disposed axially forward of the closed position, wherein the flow control seats against walls in the outlet opening of the second bypass passage when in the closed position to stop flow through the second bypass passage;

wherein the flow control comprises a tear-drop shape in cross-section, the tear-drop shape including a rounded shape upstream and a pointed surface downstream.

3. The gas turbine engine as recited in claim 2, wherein the flow control is annular about an engine axis.

4. The gas turbine engine as recited in claim 2, wherein the flow control translates axially rearward from the open position to the closed position.

5. The gas turbine engine as recited in claim 2, including an actuator for moving the flow control axially parallel to a longitudinal axis of the core engine between the open and closed positions.

\* \* \* \* \*